United States Patent [19]

Sule

[11] Patent Number: 5,533,599
[45] Date of Patent: Jul. 9, 1996

[54] HYDRAULIC BICYCLE BRAKE

[76] Inventor: Sandor Sule, Huttenlebenweg 42, CH-8240 Thayngen, Switzerland

[21] Appl. No.: 196,142

[22] PCT Filed: Mar. 31, 1993

[86] PCT No.: PCT/CH93/00088

§ 371 Date: Aug. 24, 1994

§ 102(e) Date: Aug. 24, 1994

[87] PCT Pub. No.: WO93/21057

PCT Pub. Date: Oct. 28, 1993

[30] Foreign Application Priority Data

Apr. 14, 1992 [CH] Switzerland .......... 01 222/92

[51] Int. Cl.$^6$ .......................................... B60T 11/00
[52] U.S. Cl. .......... 188/344; 188/24.22; 188/26; 188/24.12
[58] Field of Search .......... 188/344, 24.19, 188/24.22, 26, 24.12, 24.18, 360, 250 R; 92/90

[56] References Cited

U.S. PATENT DOCUMENTS

| | | | |
|---|---|---|---|
| 4,036,328 | 7/1977 | Hoffman | 188/26 |
| 4,062,427 | 12/1977 | Klaue | 188/26 |
| 4,391,353 | 7/1983 | Mathauser | 188/344 |
| 4,865,164 | 9/1989 | Kaneda | 188/344 |
| 4,896,753 | 1/1990 | Sule | 188/344 |
| 5,050,381 | 9/1991 | Matsuno | 188/344 |
| 5,082,093 | 1/1992 | Sule | 188/344 |

Primary Examiner—Douglas C. Butler
Assistant Examiner—C. T. Bartz
Attorney, Agent, or Firm—Bachman & LaPointe

[57] ABSTRACT

A hydraulic bicycle brake is kept free of leakage thanks to the fact that a hollow body is utilized, consisting of an elastic encasement (7) connected on one side with the brake piston (17) and on the other side with the inlet flange (18), having a connection to a master cylinder by means of a fluid line; whereat due to this connection of piston (17), encasement (7) and inlet flange (18) there isn't any loss of fluid and the loads due to pressure and strain exerted onto the elastic part of the hollow body respectively in the transition zone: piston bottom—encasement and solid piston bottom, have less effects than observed for common pot-like shaped diaphragm seals, because of shear-, compression- and tensile forces as well as bending moments being by their distribution on the different materials respectively their connection of less influence, thanks to this make, comprising two different materials and thus foreseeing greater security, better durability and longer service life.

17 Claims, 4 Drawing Sheets

HYDRAULIC BICYCLE BRAKE

BACKGROUND OF THE INVENTION

The invention concerns a bicycle brake with at least one master cylinder connected with a hand lever and at least one wheel cylinder or brake cylinder and, connecting the cylinders, a hydraulic fluid brake line opening at both ends into a hollow body of variable volume whereas it is possible to reduce the volume in the master cylinder by means of an organ operated by the hand lever a against an accumulator.

Actuation of the master cylinder presses hydraulic fluid out of it and into two brake cylinders in opposite position and so the pistons with brake shoes attached on the piston rods are pushed in direction of the wheel rim edge. Contact between brake shoes and rim edge leads within the master cylinder or the brake cylinder to building up of hydrostatic pressure, transformed by means of the brake shoes to braking force and friction.

By decreasing the force exerted by hand, or loosening the hand lever, the spring positioned in the master cylinder and acting as a force accumulator pushes the piston back to its starting position, thus leaving the system without any transferable or braking force.

To have minimum maintenance and optimal braking conditions the inventor decided for applying a closed and therefore leakproof hydraulic pressure system.

SUMMARY OF THE INVENTION

To make the piston exert the maximum force onto the wheel rim edge and to preserve a leakproof system, the inventor decided for a hollow body consisting of an elastic, in its cylindrical part well deformable material as casing whereas a solid, not easily deformable material is foreseen for the front or bottom region. These two, totally different materials will, depending on the application as master cylinder or brake cylinder, be adequately formed and connected making them hydraulically impermeable.

In contrast to a common known pot-like diaphragm seal where forces and also interior pressure act upon the cylindrical and bottom region of the elastic material as well, the solution following the invention, existing maximum forces in axial direction here are exerted upon the hard solid material i.e. there are hardly any transverse loads or bending moments, increasing thus service durability or service life compared to known pot-like diaphragm seals.

Maximum tensions existing at the bottom of the piston, especially in the center thereof, are again unimportant compared to the potlike diaphragm seal for there isn't at this place any elastic or soft material to be crushed or torn by fluid pressure and a hard piston.

For a common known pot-like diaphragm seal moving axially without the possibility to unwind, the loads as described can be compared to loads existing during deep-drawing of steel or aluminum.

Both frontal ring areas of the elastic casing of the master cylinder are connected hydraulically tight with the bottom,of the guiding flange and with the back of the master piston. By moving the piston directly connected with the piston rod, having an outer diameter equal to the inner diameter of the hollow body, in direction of the cylinder bottom which has an opening connected with a fluid line, a volume reduction in the master cylinder will be created and so a rise of hydrostatic pressure. The elastic casing will, solidly fixed to the bottom of the guiding flange as well as to the back of the piston, be extended by axial displacement and pressed against the outer diameter of the piston rod by fluid pressure in the cylinder.

The hydraulic fluid, displaced in the master cylinder, flows into the brake cylinder by use of the fluid line.

Both frontal ring areas of the elastic casing are tightly connected with the bottom of the piston and the bottom of the brake cylinder where this latter has an opening connected with the fluid line.

The entering fluid acting onto the bottom of the piston and piston rod with brake shoe fixed on its fore-end presses the piston forward towards the wheel rim edge or another body of the braking stem as e.g. a brake disc connected with the bicycle wheel.

By this increase of volume and after the contact between brake shoe and wheel rim edge increasing hydrostatic pressure the elastic casing is extended in axial direction and its diameter also increased, is pressed against the inner cylinder wall.

To assure an as long as possible service life of the elastic inner encasement an antifriction substance is applied onto the piston rod of the main cylinder as well as onto the inner wall Y the brake cylinder and by means of a wiping ring or other sealing element protection against contamination from outside as by dirt, dust and humidity is secured and so the friction between elastic casing and piston rod, or elastic casing and cylinder wall will be as low as possible.

This ingeniously contrived form of the hollow body makes its use for wheel rim edge brakes as also for disc brakes possible. For the disc brake the inventor chose the floating caliper type.

The floating caliper disc brake makes use of a ball joint with adjoined cylindrical sleeve having an outer diameter smaller than the diameter of the ball joint, giving so the appearance of a spherical gudgeon. It fulfills, together with the brake cylinder, the task of a guiding pin. A bore is going through this special joint and the size of this bore is so that it can take the round disc brake cylinder and an existing minimum gap or clearance allows the brake cylinder an oscillating movement. A slot is longitudinally milled into the sleeve. A pin fixed in vertical position in the brake cylinder fits into this slot, preventing the brake cylinder from turning around within the sleeve. Minimum length of this slot is given by the width or diameter of the pin plus maximum amplitude of the oscillating motion of the brake cylinder.

BRIEF DESCRIPTION OF THE DRAWINGS

Further advantages, features and details of the invention appear from the following descriptions as well as from the drawings which the following

DETAILED DESCRIPTION OF THE PREFERRED EMBODIMENTS

Figure 1:
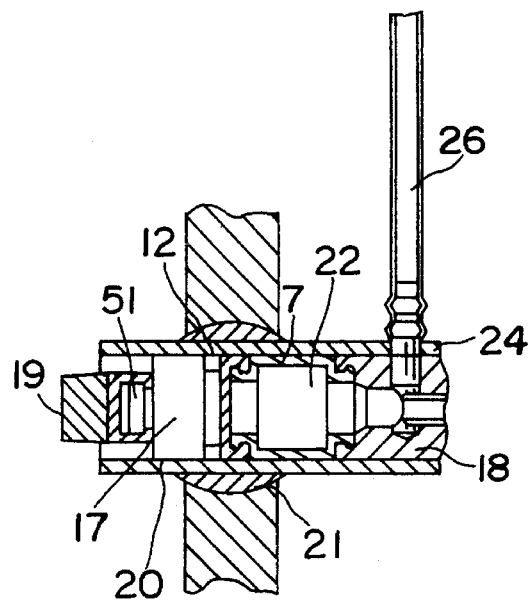
FIG. 1: Detail of the brake cylinder in longitudinal section
Figure 2:
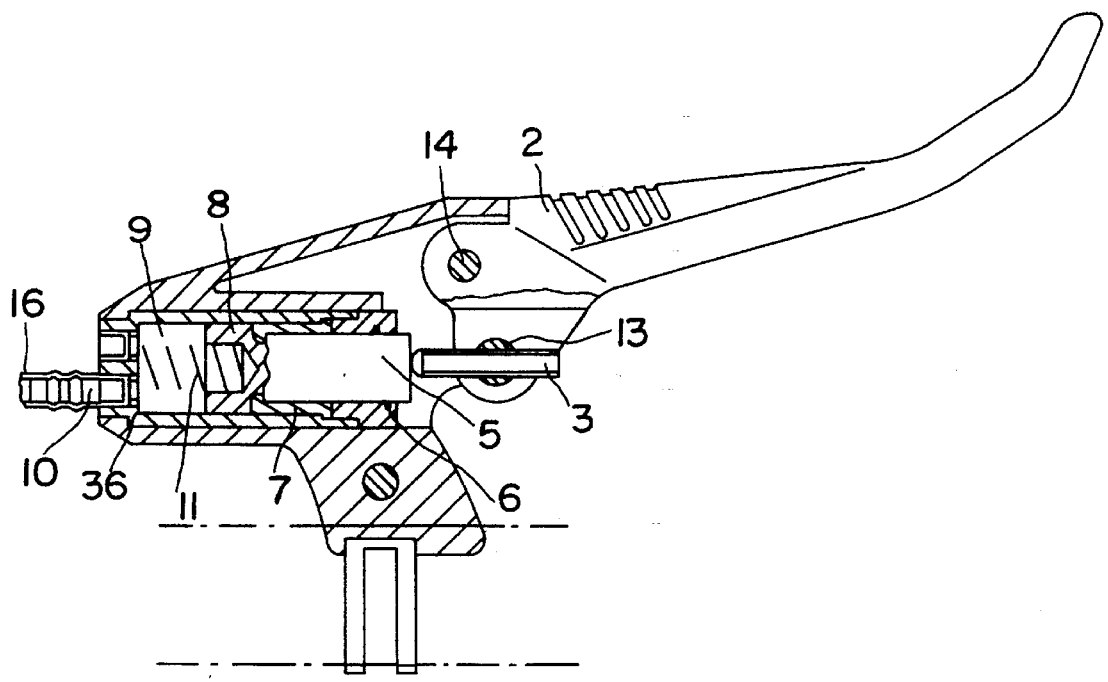
FIG. 2: Detail of the Master cylinder in longitudinal section
Figure 3:
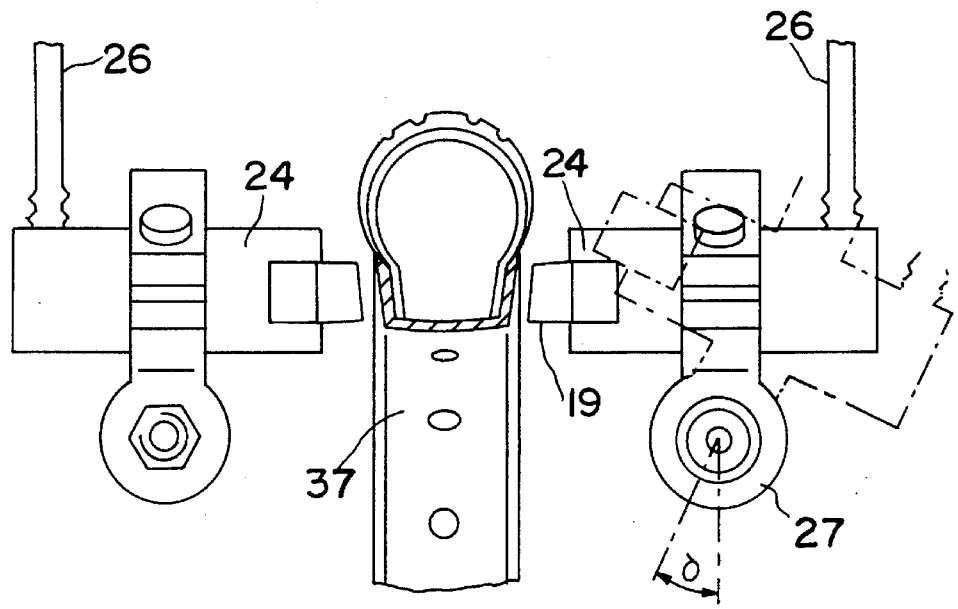
FIG. 3: Top view of the arrangement of brake cylinder with tiltable supports and cross section of a bicycle tire and wheel rim
Figure 6:
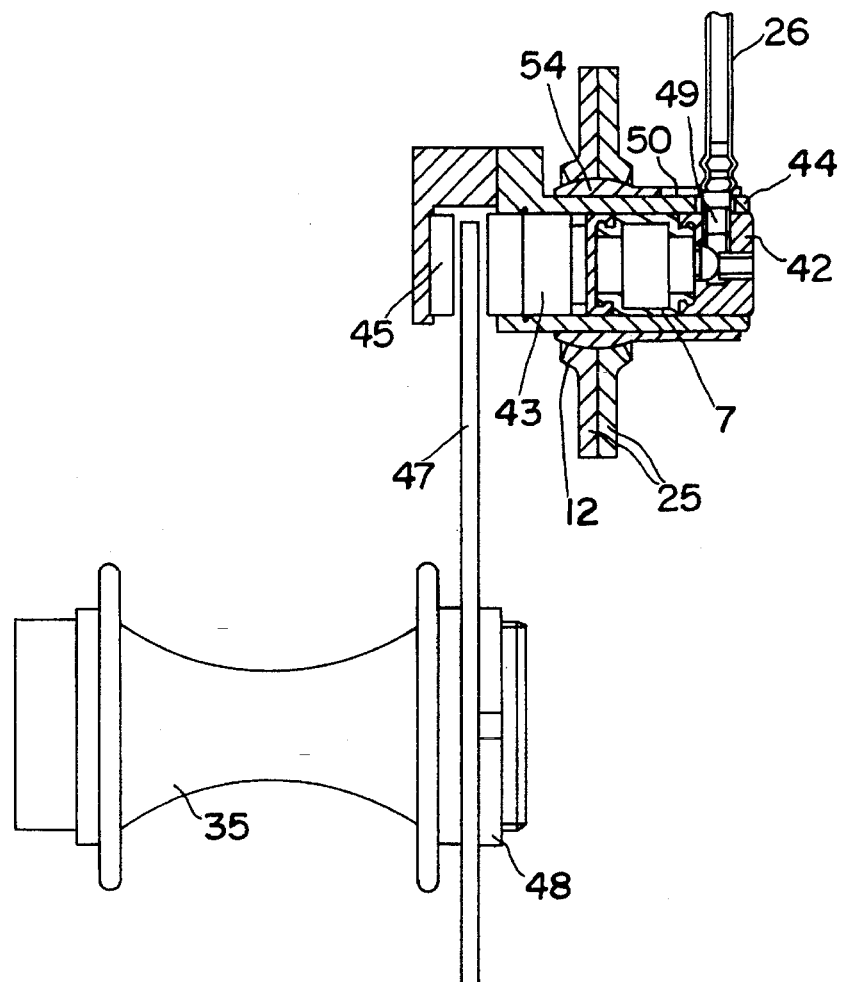
FIG. 6: Top view of the section of the disc brake with view of the wheel hub
Figure 7:
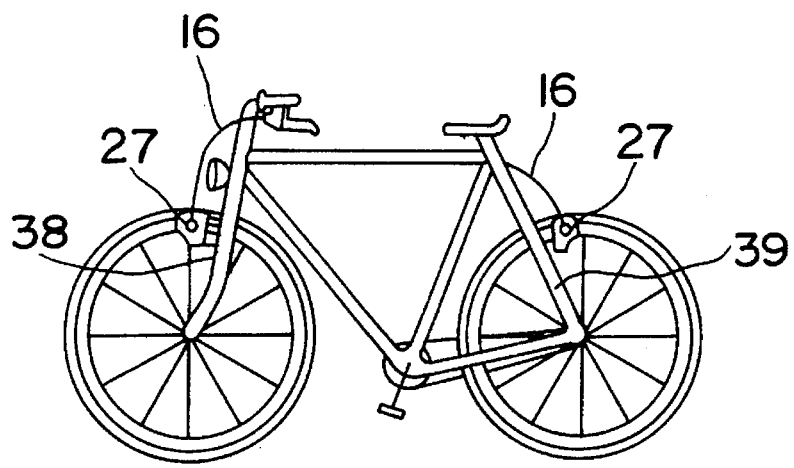
FIG. 7: Sketch-like view of a bicycle with wheel rim brakes attached
Figure 8:
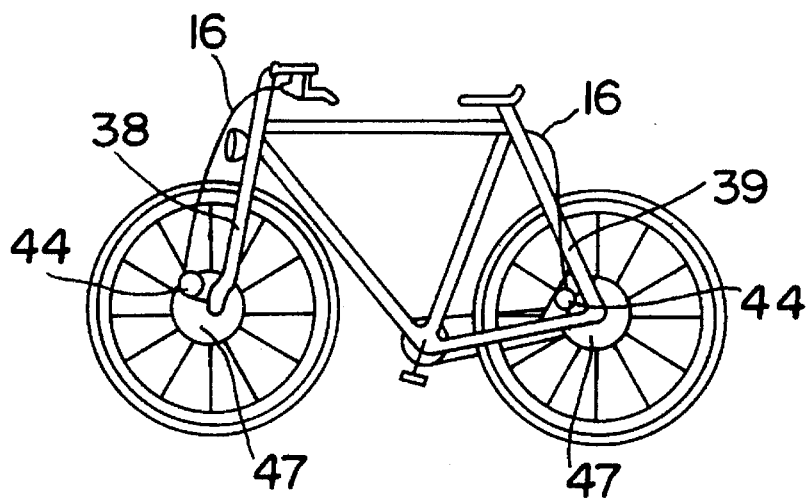
FIG. 8: Sketch-like view of a bicycle with disc brakes attached

A bicycle brake for a bicycle as shown by FIG. 7 and FIG. 8 consists, as shown in FIG. 2, of a master cylinder with hand lever (2) and one brake fluid line (16) going out from the master cylinder is directly connected with the brake cylinder (44) acting upon the brake disc (47), as shown in FIG. 6, or in connection with a Y-shaped distributor and two brake fluid lines (26), as shown in FIG. 1, coming out from it, as shown in FIG. 3, brake fluid supply is possible for two more brake cylinders.

Figure 4:
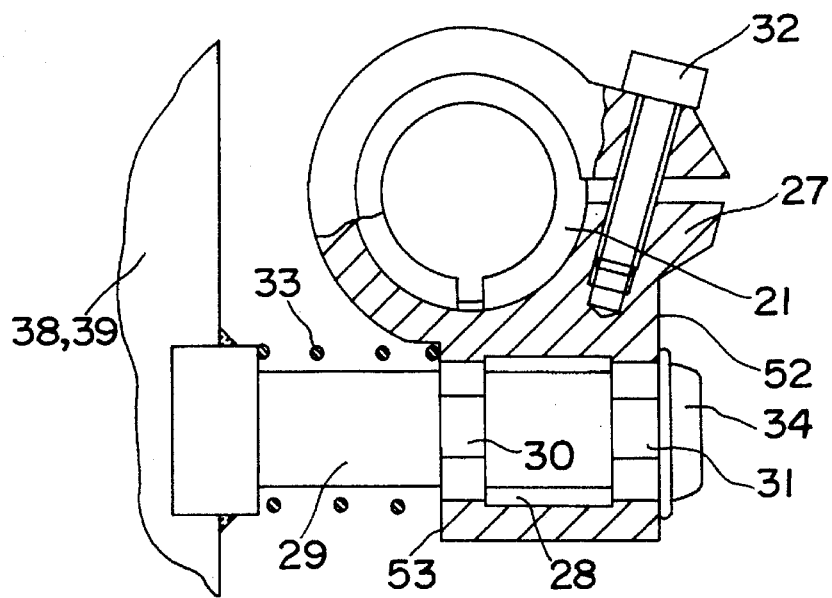
FIG. 4: Side view of the tiltable support with partial section
Figure 5:
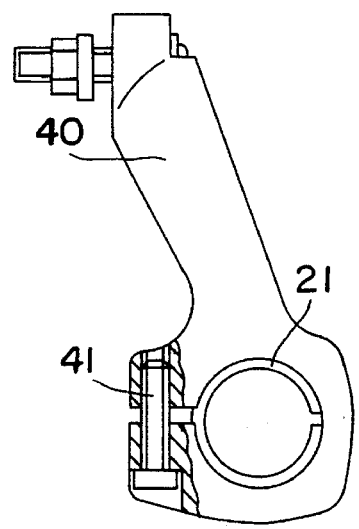
FIG. 5: Side view of the U-shaped support and partially broken-out section of the clamp

The brake cylinders (24) are attached to the bicycle by means of a U-shaped support (40), as shown in FIG. 5 or by means of a tiltable support (27), as shown in FIGS. 3 and 4.

Whereas the U-shaped support (40) is fastened on the fork head the bridge by bolt (60) and nut, as shown in FIG. 5, the support (27) ought to be fixed on the frame tube or fork tube (38), as shown in FIG. 4, by means of the intermediate bolt (29), this latter to be bonded to the fork tube, e.g. by soldering, and extending substantially parallel to wheel rim 37, as shown in FIG. 3.

Referring now to FIG. 3, for the adjustment of the brake shoes to the wheel rim edge of a wheel rim (37) whereat the brake is functioning like an opposed cylinder engine, the brake cylinder (24) can,by means of the slotted spherical joint (21), as shown in FIG. 4, incorporated in the support (27) be moved in a swiveling and also oscillating motion and so the precise position of the brake shoe and the correct distance between brake shoe tip and wheel rim edge are attained. The brake shoe (19) adjusted, the brake cylinder can be fixed due to the gripping action of the slotted spherical joint (21) by tightening the bolts (32) of the slotted support (27).

For fast replacement of the wheel or the brake shoes (19) the support (27) can be tilted by an angle, and as shown in FIG. 3. To be tiltable the support (27) has below the bore for locating the spherical joint (21), as shown in FIG. 4, a parallel in radial direction positioned hexagonal bore, having in the mid-region of its depth a circular turn-out (28) with a diameter to be larger than the hexagon-corner distance and a minimum depth which equals the length of that hexagon (30) positioned near the fox tube (38,39), the frontal side (52,33) of the laterally displaced support (27) overshooting the hexagon (31) in front position. It is to be kept in mind that the hexagons (30,31) have a beginning and an end only where the two frontal sides of the hexagonal opening of the support (27) are located. Or, the minimum length of the turn-out has to be equal to the length of the hexagon (31) positioned at the front face (52) of the support (27) and the bolt head (34) of bolt (29). Of independent inventive importance is further the fact that in lieu of a hexagon another multiple-cornered bolt or a toothed bolt can be used.

If now the support (2Y) is to be tilted, as shown in FIG. 4, it has to be pushed beyond the rear hexagon (30) towards the fork tube (38,39), whereas a pin, to be taken off before or a pressure spring (33), pushing the support (27) against the head of the bolt (34), are acting as locking or safety devices.

By actuation of the hand lever (2) around a joint (14) the threaded pin or set screw (3) held in a rotatable shaft of the joint (13) is pushed against the pushing boat or the piston rod (5) whereby this latter as guided by flange (6) is moving the disc piston (8) forward against a spring (11) in the direction of the cylinder bottom whereby the hydraulic fluid flowing out of the cylinder (9) through a nipple or brake line coupling (10) and the hydraulic line (16) and through a Y-distributor, not described in detail here, which divides the volume of the fluid to de then conducted into the inner space (22) of the two brake cylinders (24), as shown in FIGS. 1 and 3, attached on the left and right side whereas the volume of the conducted fluid depends on the way or course of the brake shoes (19) and the distribution of the hydraulic fluid following the laws of such pressure systems.

The hydraulic fluid entering the interior (22) of the cylinder (24) with leakproof connection on one side within the brake piston (17) and on the other side with an inlet flange (18), as shown in FIG. 1, pushes the disc piston (17) forward while the elastic casing (7) is extending and the circular region thereof will be pressed against the wall of the brake cylinder (24) until the brake shoe (19) has contact with the wheel rim edge. Pushing further by hand the hand lever (2) leads to a rise of hydrostatic pressure upon the disc piston (17) and piston head (51) and thus upon the brake shoe. Pistons (17, 43) have an annular groove for holding therein a gasket ring (12), as shown in FIGS. 1 and 6, respectively.

The brake piston (17) for holding the brake shoe (19) is formed so that in partial regions of a front surface of piston (17), an inward bent base of the brake shoe (19) can snap into a circular groove of the piston (17). The brake shoe exerts a hook-like grip onto the front surface of the piston wherein the front surface is in close contact with the base of the brake shoe for the transfer of braking forces. The piston head (51) has a cylindrical shape whereat radial forces are received.

Referring to FIG. 6, it is evident that the leakproof hydraulic system described here, can also be applied for disc brakes. With reference to FIG. 2, the hydraulic fluid will be pressed out of the space (9) of the master cylinder through nipple (10), fluid line (16) directly into the interior of the brake cylinder (44), as shown in FIG. 6, of the disc brake. Braking action as known for floating caliper disc brakes is now initiated and the brake shoes (46) or brake pads are moved by means of the brake cylinder (44) being incorporated and movable in axial direction in the spherical joint (54) or by piston (43) until they have contact with the brake disc (47).

With reference to FIG. 6, the spherical joint (54) is to fulfill several tasks. It helps to make the whole system production-friendly related, e.g., to the attachment of the disc brake. The holding device of the brake cylinder unit, bonded to the fork tube (38,39), as shown in FIG. 4, does not have to be precisely parallel to the brake disc before being soldered or welded, because of the swivelling and cone-like sliding motion possible for the ball joint in the divided ball socket (25) allowing parallelism between brake pads respectively the brake disc by adjustment. This divided ball socket (25) will, after adjusted parallel positioning of brake disc and brake shoe be drawn together by means of bolts, gripping so the ball joint (54) this latter then being solidly connected with the bicycle frame.

Further, therefore, the axial bore in the ball joint (54), as shown in FIG. 6, has at some time to serve as a guiding device for the floating brake cylinder (44) and the slot (56) of the ball joint sleeve, the ball joint (54) with the nipple (49) connecting the fluid line with the brake cylinder are utilized to prevent the disc brake cylinder (44) from rotating.

To fix the brake disc (47) on the hub (35) a thread is cut on one side of the hub, as known for rear wheel hubs to attach the idling sprockets. It is then necessary to have a shoulder in front of the spoke flange and keyways or indentations foreseen.

The center of the brake disc (47) is formed so that the disc (47) with keys worked in or inserted can be drawn over the thread of the hub (35) and the brake disc (47) is secured on the hub (35) by means of a nut (48).

This kind of attachment for the brake disc (47) makes it possible, that nearly all customary front wheel- and rear wheel hubs can be equipped with the disc brake (47) by a few more operations done during hub manufacturing.

What is claimed is:

1. A bicycle brake for use with a bicycle having a wheel with the rim, comprising at least one master cylinder, a hand lever connected to said master cylinder, at least one brake cylinder connected with said master cylinder by a hydraulic fluid line, a brake shoe connected to said brake cylinder and positioned near said wheel, and a support, wherein said brake cylinder is connected with said support and said support includes means for tilting said brake cylinder away from said wheel, wherein said brake is adapted to be attached to a fork tube of a bicycle via said support, and said brake further includes a support bolt having an axis, wherein said support bolt is attached to and extends from said fork tube, and wherein said support is axially displaceable on said support bolt, said means for tilting comprising said support and said support bolt being formed such that at an axial displacement over a certain length by said support on said support bolt, said support can be turned around said axis of said support bolt.

2. The bicycle brake according to claim 1, wherein said support includes a spherical joint which receives said brake cylinder.

3. The bicycle brake according to claim 1, further including a pressure spring positioned on said support bolt for providing a force, wherein said support is axially displaceable on said support bolt against said force provided by said pressure spring so as to allow said support to turn around said axis.

4. The bicycle brake according to claim 1, wherein said support includes a bore engaging said support bolt and extending substantially parallel the radial direction of said rim, wherein with said axial displacement on said support bolt, said support can be turned around the axis of said support bolt substantially transverse to the radial direction of said rim.

5. The bicycle brake according to claim 1, wherein said hydraulic fluid line has at least two ends which are connected with a space of variable volume defined in said master cylinder and said brake cylinder, wherein said space in said master cylinder can be reduced by means of a hand lever acting against a force accumulator positioned in a closed hollow body defining said space in said master cylinder, wherein said hollow body includes a casing made of a substantially leakproof elastic material, said casing connected on one side with a disc piston and on another side with a guiding flange, further comprising a pushing rod guided by said guiding flange and maintained against the bottom of said piston, wherein said pushing rod is not in contact with said elastic material in the axial direction.

6. The bicycle brake according to claim 5, wherein a threaded pin is positioned in a round bolt and wherein said round bolt is rotatably located in a joint of said hand lever and said threaded pin is adapted to push against said pushing rod.

7. The bicycle brake according to claim 5, wherein a leakproof connection is provided on one side of said master cylinder adjacent said disc piston and an inlet flange is provided on another side of said master cylinder, said inlet flange connected to a hydraulic fluid line, wherein in said master cylinder hydrostatic pressure is transformed to braking force which acts against said brake piston for transmitting said force to said brake shoe.

8. The bicycle brake according to claim 5, wherein said brake cylinder includes a brake piston movable in said space and which includes an annular groove for engaging a gasket ring.

9. The bicycle brake according to claim 5, wherein said master cylinder includes a housing with a front face and a pressure spring acting as a force accumulator positioned between said disc piston and said front face.

10. The bicycle brake according to claim 5, wherein said support has an axially slotted ball joint, and said brake cylinder is positioned in said axially slotted ball joint and axially movable and slidable, wherein said brake cylinder is clamped within said support via a locking screw, said support allowing said brake cylinder to be adjustably positioned relative to said wheel rim.

11. The bicycle brake according to claim 10, wherein said slotted ball joint is slotted in the axial direction and held by said support, and wherein said support is U-shaped.

12. The bicycle brake according to claim 10, wherein said ball joint includes a slotted sleeve and said brake cylinder is prevented from rotating via a pin fixed on said brake cylinder and guided in a slot of said slotted sleeve.

13. The bicycle brake according to claim 12, wherein said ball joint and said sleeve are adjustable and slidable, having movement in two planes and wherein said ball joint can be locked without impairing floating movement of said brake cylinder.

14. The bicycle brake according to claim 5, further comprising a disc adapted to attach to said wheel and means associated with said master cylinder for engaging said disc for forming a disc brake.

15. The bicycle brake according to claim 14, wherein said disc is fixed to a hub of said wheel of a bicycle by means of keys and prevented for falling off via a locked nut.

16. The bicycle brake according to claim 1, wherein said rim has a radial direction extending through said rim and an axial direction substantially transverse to said radial direction, wherein said support includes a bore and is connected to said bicycle via said support bolt extending from said bicycle and through said bore, wherein said bore extends substantially parallel said radial direction of said rim and wherein said means for tilting said brake cylinder further comprises said support being tiltable through an angle α on said support bolt, wherein said angle α is substantially transverse to said radial direction.

17. A bicycle brake for use with a bicycle having a wheel and a fork tube, comprising:

at least one master cylinder;

a hand lever connected to said at least one master cylinder;

a support bolt having an axis and attached to and extending from said fork tube;

a support including means for being tilted by an angle (α) away from said wheel and which is displaceable on said support bolt, wherein said means for being tilted comprises said support and said bolt being formed such that over an axial displacement of said support on said bolt of a certain length, said support can be turned around said axis of said multi-cornered bolt;

at least one brake cylinder connected with at least one master cylinder by a hydraulic fluid line and comprising a brake shoe positioned near said wheel and connected with said brake cylinder, wherein the brake cylinder is connected with said support and is tiltable with said support, said brake cylinder including a brake piston which has a front surface which holds said brake shoe on said brake cylinder, wherein said brake piston is formed such that in partial regions of said front surface, an inward bent base of said brake shoe can snap into a circular groove of said front surface such that a hook like grip is exerted onto said front surface of said piston, wherein said front surface of said piston is in close contact with said base of said brake shoe for transferring braking forces, and wherein said piston includes a head having a cylindrical portion which is adapted to receive radial forces.

* * * * *